(12) United States Patent
Roy (10) Patent No.: US 10,726,046 B2
(45) Date of Patent: Jul. 28, 2020

(54) OBJECT STORAGE SYSTEM WITH ORDERED PARALLEL REPLICATION

(71) Applicant: Western Digital Technologies, Inc., San Jose, CA (US)

(72) Inventor: Souvik Roy, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 214 days.

(21) Appl. No.: 15/980,709

(22) Filed: May 15, 2018

(65) Prior Publication Data

US 2019/0354626 A1    Nov. 21, 2019

(51) Int. Cl.
*G06F 16/27* (2019.01)
*G06F 16/28* (2019.01)

(52) U.S. Cl.
CPC .......... *G06F 16/27* (2019.01); *G06F 16/275* (2019.01); *G06F 16/289* (2019.01)

(58) Field of Classification Search
CPC ....... G06F 16/289; G06F 16/27; G06F 16/275
See application file for complete search history.

(56) References Cited

U.S. PATENT DOCUMENTS

| | | | |
|---|---|---|---|
| 9,374,395 B2 * | 6/2016 | Barton | .................... H04L 67/06 |
| 2002/0078244 A1 | 6/2002 | Howard | |
| 2015/0156174 A1 | 6/2015 | Fahey et al. | |
| 2016/0191635 A1 | 6/2016 | Greenan et al. | |
| 2017/0228290 A1 | 8/2017 | Maccanti et al. | |
| 2017/0228417 A1 | 8/2017 | Maccanti et al. | |
| 2019/0243547 A1 * | 8/2019 | Duggal | .................. G06F 9/4881 |
| 2019/0243688 A1 * | 8/2019 | Karmarkar | .............. G06F 16/27 |
| 2019/0243702 A1 * | 8/2019 | Shilane | .................. G06F 16/273 |
| 2019/0245918 A1 * | 8/2019 | Xu | ....................... H04L 67/1097 |

OTHER PUBLICATIONS

Wikipedia contributors. (May 11, 2018). BitComet. In Wikipedia, The Free Encyclopedia. Retrieved 23:15, Feb. 11, 2020, from https://en.wikipedia.org/w/index.php?title=BitComet&oldid=840663522 (Year: 2018).*
amazon.com, "Multipart Upload Overview," AWS Documentation, Amazon Simple Storage Service (S3), Developer Guide Mar. 1, 2006 (6 pages).
amazon.com, "Uploading Objects," AWS Documentation, Amazon Simple Storage Service (S3), Developer Guide Mar. 1, 2006 (2 pages).
amazon.com, "Using the AWS SDK for PHP and Running PHP Examples," AWS Documentation, Amazon Simple Storage Service (S3), Developer Guide Mar. 1, 2006 (6 pages).

* cited by examiner

*Primary Examiner* — William Spieler
(74) *Attorney, Agent, or Firm* — Patent Law Works LLP (57) ABSTRACT

Example distributed object storage systems and methods provide ordered parallel replication of data object parts. Batch lists of data objects that identify data parts for replication are generated. Available replication engines are identified and the data parts are sorted according to a predetermined order, such as largest to smallest by part size, to create an ordered list. The data parts are then sequentially assigned to the available replication engines based on the ordered list of data parts for parallel processing of replication commands. Initiate-multipart commands may be executed before the data parts are processed and complete-multipart commands may be executed after the data parts are processed.

20 Claims, 7 Drawing Sheets

OBJECT STORAGE SYSTEM WITH ORDERED PARALLEL REPLICATION

TECHNICAL FIELD

The present disclosure generally relates to data storage, and in a more particular example, to distributed data storage. Often, distributed storage systems are used to store large amounts (e.g., terabytes, petabytes, exabytes, etc.) of data, such as objects or files in a distributed and fault tolerant manner with a predetermined level of redundancy.

BACKGROUND

Object storage systems are generally known. These systems store data objects referenced by an object identifier versus file systems. One example of such is the system described by US2002/0078244, which stores files referenced by an inode, or block-based systems which store data blocks referenced by a block address in terms of scalability and flexibility. This can generally allow object storage systems to surpass the maximum limits for storage capacity of file systems in a flexible way such that for example storage capacity can be added or removed in function of the needs, while reducing degradation in performance as the system grows. As a result, object storage systems are often selected for large-scale storage systems.

Such large-scale storage systems generally distribute the stored data objects in the object storage system over multiple storage elements, such as for example hard disks, or multiple components such as storage nodes comprising a plurality of such storage elements. However, as the number of storage elements in such a distributed object storage system increase, equally the probability of failure of one or more of these storage elements increases. To cope with this issue, distributed object storage system generally use some level of redundancy, which allows the system to cope with a failure of one or more storage elements without data loss.

In its simplest form, redundancy at the object store level is achieved by replication, which means storing multiple copies of a data object on multiple storage elements of the distributed object storage system. When one of the storage elements storing a copy of the data object fails, this data object can still be recovered from another storage element holding a copy. However, replication can be costly in terms of system cost and overhead. For instance, in order to survive two concurrent failures of a storage element of a distributed object storage system, at least two replica copies for each data object are required, which results in storage capacity overhead of 200% (e.g., storing 1 gigabyte (GB) of data objects requires 3 GB of storage capacity).

One existing redundancy scheme utilizes redundant array of independent disks (RAID) systems. While some RAID implementations are more efficient than replication as storage capacity overhead is concerned, they are generally inflexible. For example, these RAID implementations often require a specific form of synchronization of the different storage elements and require the storage elements to be of the same type. Additionally, in the case of drive failure, these implementations require immediate replacement, followed by a costly and time consuming rebuild process.

In some object storage systems, data object replication is generally handled by an internal process in response to user and system actions. Replication processes are designed to comply with a defined quality of service in terms of maximum time boundary to do the replication, based on round trip time between the original site and replication site and bandwidth availability.

In object storage systems that comply with Simple Storage Services (S3) protocols, the replication solution is usually comprised of multiple GET-PUT processes, ideally run in parallel. They are targeted to complete replication of the batch of objects within a certain amount of time, generally well under the maximum time boundary defined by the quality of service. However, because the systems rely on fixed resources and managed parallelism, it may be a challenge to meet the target timeline. There are typically tradeoffs between allocation of system resources and the amount of time the system takes to complete each object replication task. The functionality of object storage systems may be improved by reducing the amount of time required for replication and maximizing the efficient use of available system resources.

A specific challenge for managing parallel processing of multiple GET-PUT processes occurs when a batch of objects for replication include objects of varying size. To partially address this, many systems include logic for handling larger data objects that includes dividing them into multiple parts, where each part is within a certain size range acceptable to the system. The parts of these multipart data objects can then be allocated across parallel replication processes. Data objects that already fall within the size range acceptable to the system are handled as single part data objects. It should be understood that even though this process reduces the range of part sizes being replicated, it is still a range and each part may be a different size. Even the parts within a multipart data object may have varying part sizes. In many systems, once a batch of objects is identified for replication, they are allocated among the parallel replication processes in that system in first in first out (FIFO) order out of the batch of object identifiers. However, this approach is unlikely to yield the best overall completion time for the batch.

Therefore, there still exists a need for improved parallel replication of batches of data objects of different sizes to improve replication time and/or use of available object storage system resources.

SUMMARY

Various aspects for data object replication, particularly, ordered parallel replication of data object parts, in distributed object storage systems are described. In an innovative aspect, a system comprises at least one processor, at least one memory coupled to the at least one processor, and a plurality of storage nodes configured to receive data objects. A plurality of replication engines in the at least one memory for execution by the at least one processor are each configured to communicate with at least one of the plurality of storage nodes. A batch collector is stored in the at least one memory for execution by the at least one processor. The batch collector is configured to generate a batch list of data objects in response to a replication request. The batch list of data objects identifies a plurality of data parts, each of the data parts having a part size. A replication work generator is stored in the at least one memory and executable by the at least one processor to perform operations comprising: identifying a number of available replication engines from the plurality of replication engines; receiving the batch list from the batch collector; sorting the plurality of data parts according to a predetermined order thereby creating an ordered list of data parts; and sequentially assigning the plurality of data parts from the ordered list across the number of available replication engines for parallel processing of replication commands by the available replication engines.

In various embodiments, each of the plurality of replication engines corresponding to the number of available replication engines receive a replication command from the replication work generator. Each of the replication engines completes the replication command and communicates a command complete message to the replication work generator. The replication work generator may assign a next data part from the ordered list to a replication engine upon receipt of the command complete message and send a next replication command to the replication engine for the next data part.

In some embodiments, the predetermined sorting routine is according to part size from largest part size to smallest part size. The batch list of data objects may include a plurality of multipart data objects and the replication work generator may assign initiate-multipart replication commands for each of the plurality of multipart data objects to the available replication engines prior to assigning the plurality of data parts from the ordered list to the available replication engines. The batch list of data objects may include at least one multipart data object and at least one singlepart data object and the ordered list of data parts may include the at least one singlepart data object in between data parts corresponding to the at least one multipart data object.

In various embodiments, processing of the replication commands by the available replication engines includes executing a local get operation and executing a put operation to the at least one of the plurality of storage nodes. The batch list of data objects may include an object resource locator, an object size, an object type, and an operation type for each data object. The object type may include a multipart object type and the batch list may further include part sizes for the multipart object type.

In another innovative aspect, a computer-implemented method provides ordered parallel replication of data object parts. A batch list of data objects is generated in response to a replication request. The batch list of data objects identifies a plurality of data parts, each of the data parts having a part size. A number of available replication engines is identified from a plurality of replication engines. Each of the plurality of replication engines is configured to communicate with at least one of a plurality of storage nodes and the plurality of storage nodes are configured to receive data objects. The plurality of data parts in the batch list are sorted according to a predetermined order, thereby creating an ordered list of data parts. The plurality of data parts are sequentially assigned from the ordered list across the number of available replication engines for parallel processing of replication commands by the available replication engines. The replication commands corresponding to the plurality of data parts from the ordered list are processed using the number of available replication engines, where a next available replication engine sends a next data part from the ordered list to the at least one of the plurality of storage nodes.

In various embodiments, sequentially assigning the plurality of data parts is executed by a replication work generator. Sequentially assigning further comprises sending replication commands from the replication work generator to the available replication engines and receiving command complete messages from the available replication engines to the replication work generator to indicate the next available replication engine is ready to send the next data part from the ordered list.

In some embodiments, generating the batch list of data objects is executed by a batch collector. The predetermined sorting routine may be according to part size from largest part size to smallest part size. The batch list of data objects may include a plurality of multipart data objects and further comprise assigning initiate-multipart replication commands for each of the plurality of multipart data objects to the available replication engines prior to assigning the plurality of data parts from the ordered list to the available replication engines. The batch list of data objects may include at least one multipart data object and at least one singlepart data object and the ordered list of data parts may include the at least one singlepart data object in between data parts corresponding to the at least one multipart data object.

In various embodiments, processing the replication commands includes executing a local get operation and executing a put operation to the at least one of the plurality of storage nodes. The batch list of data objects may include an object resource locator, an object size, an object type, and an operation type for each data object. The object type may include a multipart object type and the batch list further includes part sizes for the multipart object type.

In yet another innovative aspect, a system provides ordered parallel replication of data object parts. Means are provided for generating a batch list of data objects in response to a replication request. The batch list of data objects identifies a plurality of data parts, each of the data parts having a part size. Means are provided for identifying a number of available replication engines from a plurality of replication engines. Each of the plurality of replication engines is configured to communicate with at least one of a plurality of storage nodes. The plurality of storage nodes are configured to receive data objects. Means is provided for sorting the plurality of data parts in the batch list according to a predetermined order, thereby creating an ordered list of data parts. Means are provided for sequentially assigning the plurality of data parts from the ordered list across the number of available replication engines for parallel processing of replication commands by the available replication engines. Means are provided for processing the replication commands corresponding to the plurality of data parts from the ordered list using the number of available replication engines where a next available replication engine sends a next data part from the ordered list to the at least one of the plurality of storage nodes.

In various embodiments, the batch list of data objects includes at least one multipart data object and at least one singlepart data object. The ordered list of data parts includes the at least one singlepart data object in between data parts corresponding to the at least one multipart data object and the predetermined sorting routine is according to part size from largest part size to smallest part size.

The various embodiments advantageously apply the teachings of distributed object storage networks and/or systems to improve the functionality of such computer systems. The various embodiments include operations to overcome or at least reduce the issues in the previous storage networks and/or systems discussed above and, accordingly, are more reliable and/or efficient than other computing networks. That is, the various embodiments disclosed herein include hardware and/or software with functionality to improved parallel replication of batches of data objects of different sizes, based on improved replication time and/or more efficient use of available object storage system resources. Accordingly, the embodiments disclosed therein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1A:
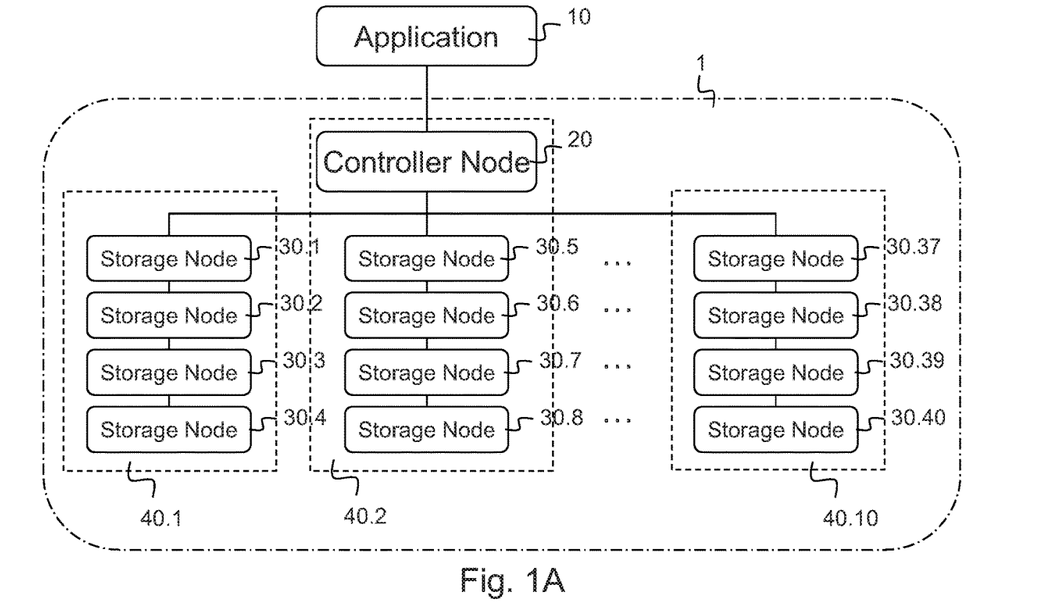
FIG. 1A schematically illustrates an example embodiment of a distributed object storage system.

FIG. 1A shows an embodiment of an example distributed storage system 1. According to this embodiment the distributed storage system 1 may be implemented as a distributed object storage system 1 which is coupled to an application 10 for transferring data objects. The connection between the distributed storage system 1 and the application 10 could, for example, be implemented as a suitable data communication network. Such an application 10 could, for example, be a dedicated software application running on a computing device, such as a personal computer, a laptop, a wireless telephone, a personal digital assistant or any other type of communication device that is able to interface directly with the distributed storage system 1. However, according to alternative embodiments, the application 10 could for example comprise a suitable file system which enables a general purpose software application to interface with the distributed storage system 1, an application programming interface (API) library for the distributed storage system 1, etc.

As further shown in FIG. 1A, the distributed storage system 1 comprises a controller node 20 and a plurality of storage nodes 30.1-30.40 which may be coupled in a suitable way for transferring data, for example by means of a conventional data communication network such as a local area network (LAN), a wide area network (WAN), a telephone network, such as the public switched telephone network (PSTN), an intranet, the internet, or any other suitable communication network or combination of communication networks. Controller node 20, storage nodes 30 and the device comprising application 10 may connect to the data communication network by means of suitable wired, wireless, optical, etc. network connections or any suitable combination of such network connections. Although the embodiment of FIG. 1A shows only a single controller node 20 and forty storage nodes 30, according to alternative embodiments the distributed storage system 1 could comprise any other suitable number of storage nodes 30 and, for example, two, three or more controller nodes 20 coupled to these storage nodes 30.

These controller nodes 20 and storage nodes 30 can be built as general-purpose computers, however more frequently they are physically adapted for arrangement in large data centers, where they are arranged in modular racks 40 comprising standard dimensions. Exemplary controller nodes 20 and storage nodes 30 may be dimensioned to take up a single unit of such rack 40, which is generally referred to as 1 U. Such an exemplary storage node may use a low-power processor and may be equipped with ten or twelve high capacity serial advanced technology attachment (SATA) disk drives and is connectable to the network over redundant Ethernet network interfaces. An exemplary controller node 20 may comprise high-performance servers and provide network access to applications 10 over multiple high bandwidth Ethernet network interfaces. Data can be transferred between applications 10 and such a controller node 20 by means of a variety of network protocols including http/representational state transfer (REST) object interfaces, language-specific interfaces such as Microsoft .Net, Python or C, etc. Additionally, such controller nodes may comprise additional high bandwidth Ethernet ports to interface with the storage nodes 30. Preferably, such controller nodes 20 operate as a highly available cluster of controller nodes, and provide for example shared access to the storage nodes 30, metadata caching, protection of metadata, etc.

As shown in FIG. 1A several storage nodes 30 can be grouped together, for example because they are housed in a single rack 40. For example, storage nodes 30.1-30.4; 30.5-30.8; . . . ; and 30.7-30.40 each are respectively grouped into racks 40.1, 40.2, . . . 40.10. Controller node 20 could for example be located in rack 40.2. These racks are not required to be located at the same location, they are often geographically dispersed across different data centers, such as for example rack 40.1-40.3 can be located at a data center in Europe, 40.4-40.7 at a data center in the USA and 40.8-40.10 at a data center in China.

Figure 1B:
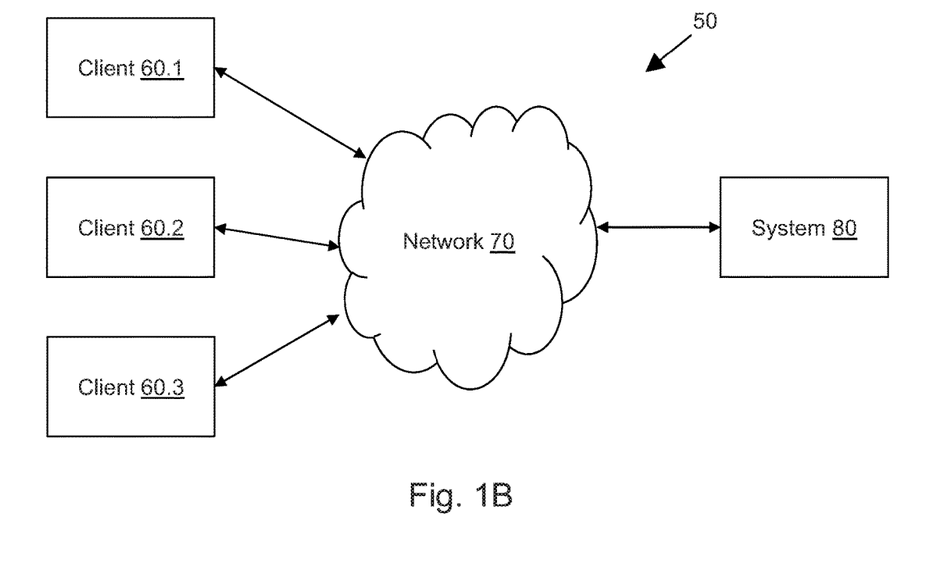
FIG. 1B schematically illustrates an example client architecture in which some embodiments of the distributed object storage system of FIG. 1A may operate.

FIG. 1B is a block diagram of an example storage network 50 using a client architecture. In some embodiments, distributed storage system 1 may be embodied in such a storage network 50. As shown, storage network 50 can include multiple client devices 60 capable of being coupled to and in communication with a storage network 50 via a wired and/or wireless network 70 (e.g., public and/or private computer networks in any number and/or configuration (e.g., the Internet, an intranet, a cloud network, etc.)), among other examples that may include one client device 60.1 or two or more client devices 60 (e.g., is not limited to three client devices 60.1-60.3).

A client device 60 can be any computing hardware and/or software (e.g., a thick client, a thin client, or hybrid thereof) capable of accessing storage system 80 utilizing network 70. Each client device 60, as part of its respective operation, relies on sending input/output (I/O) requests to storage system 80 to write data, read data, and/or modify data. Specifically, each client device 60 can transmit I/O requests to read, write, store, communicate, propagate, and/or transport instructions, data, computer programs, software, code, routines, etc., to storage system 80. Client device(s) 60 and storage system 80 may comprise at least a portion of a client-server model. In general, storage system 80 can be accessed by client device(s) 60 and/or communication with storage system 80 can be initiated by client device(s) 60 through a network socket (not shown) utilizing one or more inter-process networking techniques. In some embodiments, client devices 60 may access one or more applications, such as application 10 in FIG. 1A, to use or manage a distributed storage system, such as distributed storage system 1 in FIG. 1A.

Figure 2:
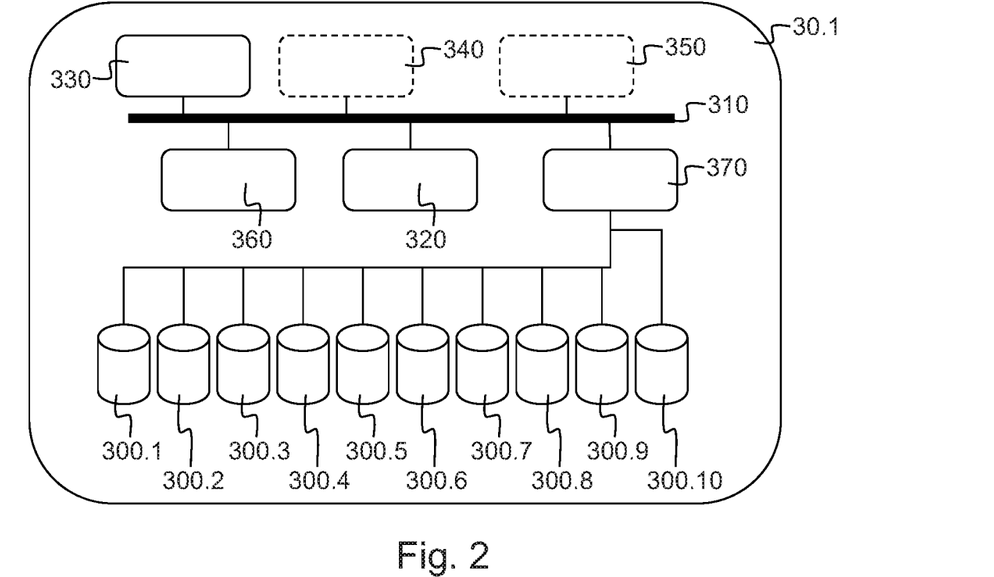
FIG. 2 schematically illustrates an example embodiment of a storage node of the distributed storage system of FIG. 1A.

FIG. 2 shows a schematic representation of an embodiment of one of the storage nodes 30. Storage node 30.1 may comprise a bus 310, a processor 320, a local memory 330, one or more optional input units 340, one or more optional output units 350, a communication interface 360, a storage element interface 370, and two or more storage elements 300.1-300.10. Bus 310 may include one or more conductors that permit communication among the components of storage node 30.1. Processor 320 may include any type of conventional processor or microprocessor that interprets and executes instructions. Local memory 330 may include a random access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to the storage node 30.1, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 30.1 to communicate with other devices and/or systems, for example mechanisms for communicating with other storage nodes 30 or controller nodes 20 such as for example two 1 Gb Ethernet interfaces.

Storage element interface 370 may comprise a storage interface such as for example a SATA interface or a small computer system interface (SCSI) for connecting bus 310 to one or more storage elements 300, such as one or more local disks, for example 3 terabyte (TB) SATA disk drives, and control the reading and writing of data to/from these storage elements 300. In one exemplary embodiment as shown in FIG. 2, such a storage node 30.1 could comprise ten or twelve 3 TB SATA disk drives as storage elements 300.1-300.10 and in this way storage node 30.1 would provide a storage capacity of 30 TB or 36 TB to the distributed object storage system 1. According to the exemplary embodiment of FIG. 1 and in the event that storage nodes 30.2-30.40 are identical to storage node 30.1 and each comprise a storage capacity of 36 TB, the distributed storage system 1 would then have a total storage capacity of 1440 TB.

As is clear from FIGS. 1A and 2 the distributed storage system 1 comprises a plurality of storage elements 300. As will be described in further detail below, the storage elements 300, could also be referred to as redundant storage elements 300 as the data is stored on these storage elements 300 such that none or a specific portion of the individual storage elements 300 on its own is critical for the functioning of the distributed storage system. Each of the storage nodes 30 may comprise a share of these storage elements 300.

As shown in FIG. 1A storage node 30.1 comprises ten storage elements 300.1-300.10. Other storage nodes 30 could comprise a similar amount of storage elements 300, but this is, however, not essential. Storage node 30.2 could, for example, comprise six storage elements 300.11-300.16, and storage node 30.3 could, for example, comprise four storage elements 300.17-300.20. As will be explained in further detail below, the distributed storage system 1 may be operable as a distributed object storage system 1 to store and retrieve a data object 500 comprising data (e.g. 64 megabytes (MB) of binary data) and a data object identifier for addressing this data object 500, for example, a universally unique identifier such as a globally unique identifier (GUID). Embodiments of the distributed storage system 1 may operate as a distributed object storage system 1. Storing the data offered for storage by the application 10 in the form of a data object, also referred to as object storage, may have specific advantages over other storage schemes such as conventional block-based storage or conventional file-based storage.

The storage elements 300 or a portion thereof may be redundant and operate independently of one another. This means that if one particular storage element 300 fails its function it can easily be taken on by another storage element 300 in the distributed storage system 1. However, as will be explained in more detail further below, the storage elements 300 are capable of providing redundancy without having to work in synchronism, as is for example the case in many well-known RAID configurations, which sometimes even require disc spindle rotation to be synchronised. Furthermore, the independent and redundant operation of the storage elements 300 may allow a suitable mix of types of storage elements 300 to be used in a particular distributed storage system 1. It is possible to use for example storage elements 300 with differing storage capacity, storage elements 300 of differing manufacturers, using different hardware technology such as for example conventional hard disks and solid state storage elements, using different storage interfaces such as for example different revisions of SATA, parallel advanced technology attachment (PATA), and so on. This may result in advantages relating to scalability and flexibility of the distributed storage system 1 as it allows for adding or removing storage elements 300 without imposing specific requirements to their design in correlation to other storage elements 300 already in use in the distributed object storage system 1.

Figure 3:
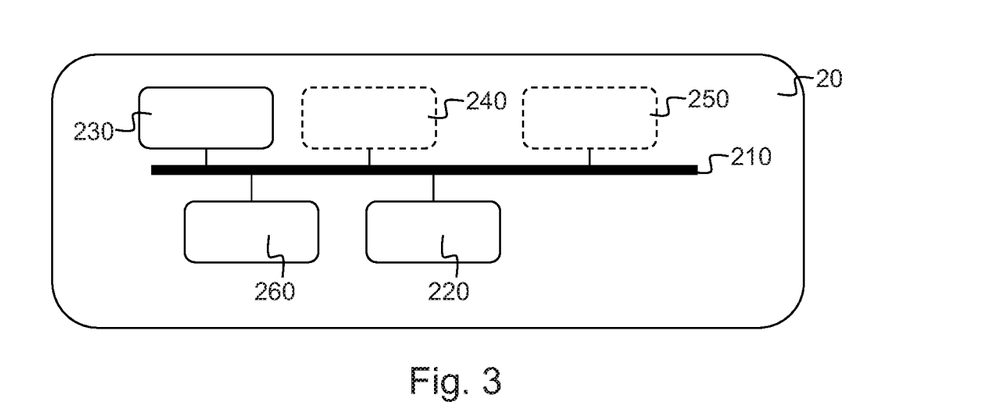
FIG. 3 schematically illustrates an example embodiment of a controller node of the distributed storage system of FIG. 1A.

FIG. 3 shows a schematic representation of an embodiment of the controller node 20. Controller node 20 may comprise a bus 210, a processor 220, a local memory 230, one or more optional input units 240, one or more optional output units 250. Bus 210 may include one or more conductors that permit communication among the components of controller node 20. Processor 220 may include any type of conventional processor or microprocessor that interprets and executes instructions. Local memory 230 may include a random access memory (RAM) or another type of dynamic storage device that stores information and instructions for execution by processor 220 and/or a read only memory (ROM) or another type of static storage device that stores static information and instructions for use by processor 320 and/or any suitable storage element such as a hard disc or a solid state storage element. An optional input unit 240 may include one or more conventional mechanisms that permit an operator to input information to the controller node 20 such as a keyboard, a mouse, a pen, voice recognition and/or biometric mechanisms, etc. Optional output unit 250 may include one or more conventional mechanisms that output information to the operator, such as a display, a printer, a speaker, etc. Communication interface 260 may include any transceiver-like mechanism that enables controller node 20 to communicate with other devices and/or systems, for example mechanisms for communicating with other storage nodes 30 or controller nodes 20 such as for example two 10 Gb Ethernet interfaces.

According to an alternative embodiment, the controller node 20 could have an identical design as a storage node 30, or according to still a further alternative embodiment one of the storage nodes 30 of the distributed object storage system could perform both the function of a controller node 20 and a storage node 30. According to still further embodiments, the components of the controller node 20 as described in more detail below could be distributed amongst a plurality of controller nodes 20 and/or storage nodes 30 in any suitable way. According to still a further embodiment, the device on which the application 10 runs is a controller node 20.

Figure 4:
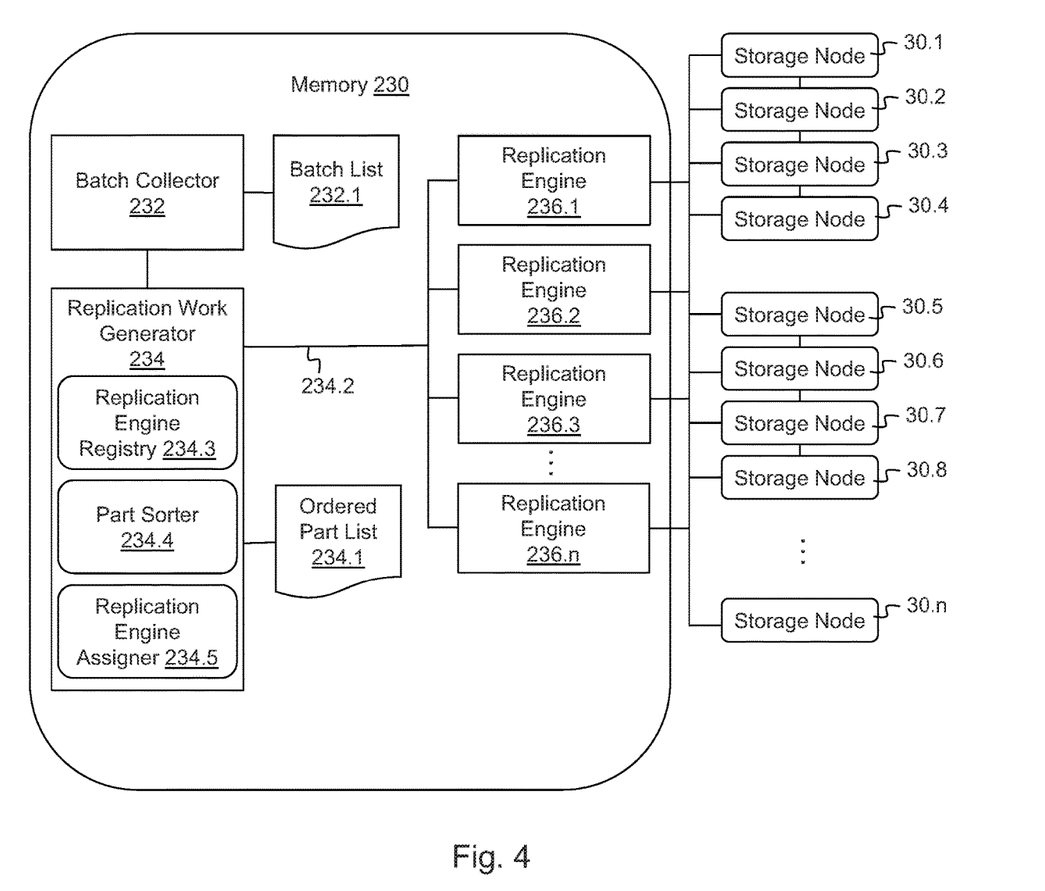
FIG. 4 schematically illustrates some example elements of the controller node of FIG. 3 in more detail.

As schematically shown in FIG. 4, an embodiment of the controller node 20 comprises three types of functional modules: a batch collector 232; a replication work generator 234; and a plurality of replication engines 236.1-236.n. These modules 232, 234, 236 can for example be implemented as programming instructions stored in local memory 230 of the controller node 20 for execution by its processor 220. In addition, FIG. 4 shows connections between replication engines 236.1-236.n and storage nodes 30.1-30.n, which may be storage nodes as described with regard to FIG. 2. In some embodiments, storage nodes 30.1-30.n may be remote object stores. These connections between replication engines 236.1-236.n and storage nodes 30.1-30.n may include any channel for communicating directly or indirectly with storage nodes 30.1-30.n, including communication interface 260 of controller node 20.

Modules 232, 234, 236 may comprise a subsystem for managing part ordered replication on storage nodes 30.1-30.n and, more specifically, efficiently allocating data parts for parallel processing through the available replication engines of replication engines 236. An objective of modules 232, 234, 236 may be to minimize the time spent processing any given batch of data objects given the available replication engines. This objective may be better understood in terms of the system constraints present in distributed storage system 1. For example, there may be a guaranteed fixed bandwidth between the location currently hosting the data objects, such as a data center in the U.S., and the location to which the data objects are being replicated, such as a data center in Europe. Similarly, a guaranteed fixed round trip time may also exist between the two sites. Further, a service level agreement or other system parameter may define the amount of time allowed for replication. While FIG. 4 shows any number of replication engines, any given distributed storage system 1 will have a fixed amount of memory and processing capacity to allocate to replication engines. The time spent processing a batch of data may by reduced by balancing, as much as possible, the workloads of the available replication engines and making sure that individual replication engines are not given too much work or left waiting more than necessary for the next task. In general, replication engines are configured based on resource availability and the replication engines in any given system have adequate computing resources in terms of memory and processing. Their primary constraint is the data transfer time to the target storage node. Similarly, administrative operations, such as Initiate Multipart and Complete Multipart operations, do not take considerable time compared to the data transfer time. Therefore, the size of the part being transferred may provide a strong correlation to the relative time that replication engines will need to complete their assigned tasks.

Batch collector 232 generates batch list 232.1 for identifying the data objects included in any given batch transfer. For example, batch collector 232 may respond to a system request to replicate a batch of objects. This may include user or administrator-initiated replication actions or an automated request based on various system or data management processes operating within distributed storage system 1. For example, completion of a series of processes in application 10 or accumulation of objects in a buffer may trigger a request to replicate the relevant data objects. As another example, whenever a user PUTs an object into distributed storage system 1, it is logged to batch collector 232. Batch collector 232 maintains a list of user PUTs in memory or on disk. Once a predetermined batch size threshold is reached, for example, based on the number of objects or total size of accumulated objects, batch collector 232 generates and forwards batch list 232.1 to replication work generator 234.

Batch list 232.1 includes information for delineating a group of objects to be replicated as a batch. For example, batch list 232.1 may be a data array or table with entries for each object included in the batch. It may also include additional administrative information, such as a batch identifier, aggregated parameters of the batch, or other batch-level information. Batch list 232.1 may include list of parameters for each object in the batch. For example, each object entry in the batch list may include an object universal resource locator (URL) (e.g. GUID or other object resource locator), a total object size, an object type (e.g. singlepart or multipart), and an operation type (e.g. PUT or DELETE). In some embodiments, objects with a multipart object type may also include a list of part sizes for their corresponding parts. So, an example object entry in batch list 232.1 may be: "Bucket1/userobj/notes/obj1, 13(2,3,4,1,2,1), MP, PUT", where the first portion is the object URL (including path information), 13 is the object size, (2,3,4,1,2,1) are the part sizes, MP is the code for multipart objects, and PUT is the requested operation.

Note that the creation of multipart objects and logic for doing so are beyond the scope of this disclosure and techniques for doing so are well known. Any given distributed storage system 1 may include a maximum permissible part size, for example 15 MB, and any object with an object size equal to or greater than the maximum permissible part size will be separated into a multipart object. Such systems may also include a minimum permissible part size, such as 5 MB, that each part of a multipart object, other than the last part, must be equal to or greater than. Note that multipart objects are not necessarily divided evenly or into a standard part size with one different remainder. The algorithms for creating multipart objects may use other object parameters, data structures, or system parameters to create parts in a range of sizes within a single multipart object.

Replication work generator 234 may be responsible for generating and assigning replication work to replication engines 236. In some embodiments, replication work generator 234 generates an ordered part list 234.1 according to a predetermined sorting routine, such as largest to smallest by part size. Each replication task may be represented by a replication command 234.2 sent from replication work generator 234 to an assigned replication engine selected from replication engines 236.1-236.n. For example, replication command 234.2 may include a local GET or GET metadata command, in order to locate and buffer the local information to be replicated, and one PUT command, such as a singlepart PUT or multipart PUT, to send the local information to a selected destination storage node selected from storage nodes 30.1-30.n. Additional replication commands may include Initiate Multipart upload and Complete Multipart upload commands. A singlepart data object may require only a single replication command 234.2 corresponding to a single replication work item. A multipart data object may require multiple replications commands, such as replication command 234.2, in order to initiate the multipart upload, send multiple data parts, and complete the multipart upload. For example, one Initiate Multipart Upload command, three Part PUT commands corresponding to the three parts of an example multipart data object, and one Complete Multipart Upload work item command may be provided by replication work generator 234 to replication engines 236 to complete a multipart object replication. Note that the different commands for a multipart object need not be processed by the same replication engine from among replication engines 236 and, in fact, it is preferable to complete the different commands in parallel using multiple available replications, particularly the Part PUT commands. Replication work generator 234 may organize and assign the replication commands such that a batch replication including a plurality of data object, including multipart and singlepart data objects, achieves completion with improved resource usage and reduced overall time versus allocating the replication commands based on the order of the objects in batch list 232.1.

Once replication work generator 234 receives batch list 232.1 or is otherwise notified that a specific batch of data objects is ready for replication, replication work generator 234 manages the allocation or work among the available replication engines 236. More specifically, replication work generator 234 identifies a number of available replication engines 236 to be used in replicating the batch of data objects contained in batch list 232.1. In some embodiments, local memory 230 includes a fixed deployment or replication engines 236 and all of those replication engines 236 may be available for use by replication work generator 234 for processing any given batch list 232.1 (for example, if there is only one replication work generator 234 supported by replication engines 236). In other embodiments, replication engines 236 are dynamically allocated to replication work generator 234 and a smaller number of all possible replication engines 236 may be available for processing any given batch of data objects. In one embodiment, replication work generator 234 includes a replication engine registry 234.3 to track the available replication engines from among replication engines 236. For example, replication engine registry 234.3 may include a FIFO list of replication engines 236 in order of when they last completed a replication task. When no replication tasks are running, replication engine registry 234.3 may include all replication engines 236 in local memory 230 or, at least, all replication engines 236 allocated for use by replication work generator 234. In some embodiments, when a replication engine from replication engines 236 completes a replication task represented by a replication command 234.2, the replication engine may provide a command complete message to replication work generator 234 and replication work generator 234 may add the replication engine to replication engine registry 234.3 as being available for a next replication command.

Replication work generator 234 uses batch list 232.1 to determine the replication tasks that need to be completed for replication of the batch of data objects by the available replication engines from replication engines 236. In some embodiments, the replication work generator 234 may identify one or more administrative commands, such as Initiate Multipart commands, that can be processed in advance of data replication commands and immediately assign and send those commands to available replication engines for each multipart object in batch list 232.1. Replication work generator 234 may create ordered list 234.1 of data parts corresponding to all data objects in batch list 232.1 in part sorter 234.4. The list of data parts may be initially arranged in the order the data objects appear in batch list 232.1 and may include metadata related to the data objects and data parts that was provided in batch list 232.1, such as object and part identifiers and part size. Note that the part size of a singlepart data object may be equal to the object size for the singlepart data object and batch list 232.1 or related metadata may not include a separate part size value. Part sorter 234.4 may then use a predetermined sorting routine to reorder the data parts into a more efficient queue of replication commands. For example, part size may be used to reorder the data parts in ordered list 234.1 from largest part size to smallest part size, such that the corresponding replication commands will be processed in part size order from largest to smallest. Note that this part size order may be regardless of what object the part belongs to and may freely intermingle data parts from different multipart object and singlepart data objects, such that a single part data object may be situated between data parts from a multipart data object. Similarly, data parts from multipart data objects may be between data parts from other multipart data objects. Ordered part list 234.1. may provide a command queue for assigning work replication commands to replication engines 236. In some embodiments, other sorting routines besides largest-to-smallest part size may be used. For example, other sorting routines found to correspond to the relative processing time of data parts and calculated from available metadata or system data provided to replication work generator 234. In some embodiments, other replication commands, such as Initiate Multipart and Multipart Complete may be included in ordered part list 234.1 at the beginning and ends of ordered part list 234.1 respectively, but are treated as parts of minimal size and positioned according to their function rather than size.

A replication work assigner 234.5 may then sequentially assign and send replication commands corresponding to data parts in ordered part list 234.1 to replication engines 236 according to those available for new tasks in replication engine registry 234.3. For example, replication work assignor 234.5 may select the replication engine from the replication engine registry 234.3 that first completed its prior replication task and assign the next replication task corresponding to the next data part in ordered part list 234.1. In some embodiments, replication engine assigner 234.5 causes replication work generator 234 to send a replication command for the next available data part or administrative command to the first available replication engine among replication engines 236. Replication work assigner 234.5 may then proceed through all available replication engines 236 in round robin fashion until the data parts in ordered part list 234.1 are replicated and any related administrative messages, such as Multipart Complete, are sent.

Replication engines 236 receive and perform replication work items, each replication engine running in parallel with other replication engines to complete data replication with improved efficiency. Each replication engine 236.1-236.n is capable of receiving replication tasks from replication work generator 234 and performing those replication tasks in accordance with the command syntax and communication protocols of storage nodes 30. In general, this may include retrieving data from one location, such as a local data source, using a GET or similar command and sending it to another location, such as a remote storage node, using a PUT or similar command. Replication engines 236 may also include administrative messaging to replication work generator 234 to enable them to register their availability and communicate when replication tasks complete, such as a SUCCESS message when a transfer to a target storage node is complete. Similarly, replication engines 236 may receive administrative messages from storage nodes 30 and provide relevant messages to replication work generator 234 and/or other components of distributed storage system 1.

Figure 5:
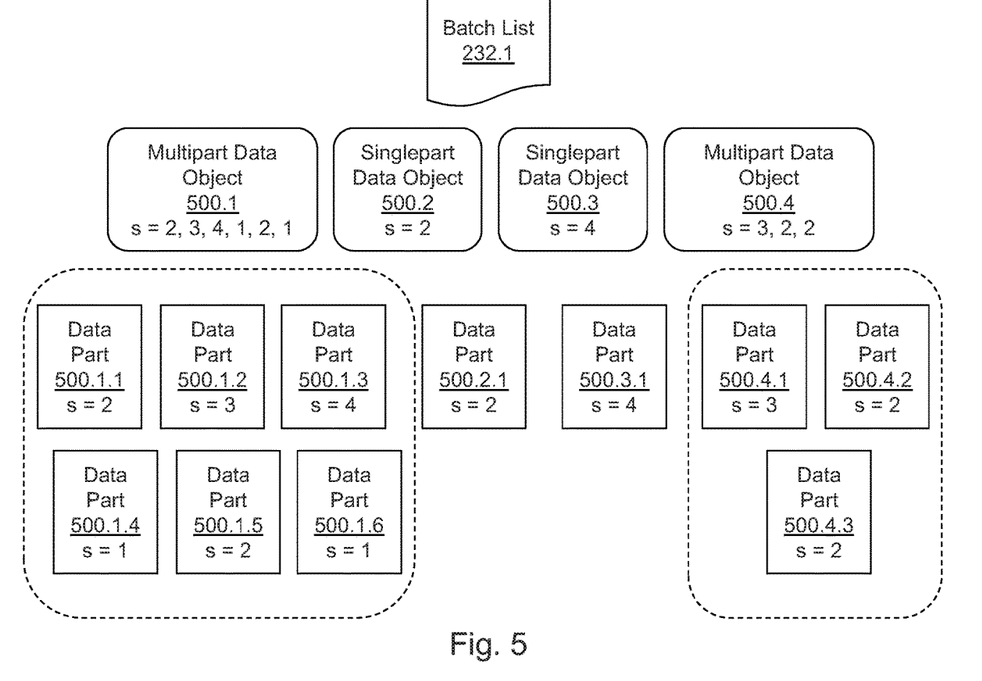
FIG. 5 schematically illustrates an example batch list for replication by the controller node of FIG. 3.

The functioning of these modules 232, 234, 236 will now be explained based on an example of batch list 232.1 through FIGS. 5-7. In FIG. 5, batch list 232.1 includes entries for four data objects 500. Multipart data object 500.1 includes six data parts ranging in size from 1-4 units and totalling 13 units for the object size. Note that for the purpose of this example, part and object size are being expressed in generic units that could correspond to the data object handling size parameters of any given system. For example, 1 unit could be interpreted as the minimum acceptable part size and the other numbers as multiples thereof, such as 5 MB minimum size and a range of part sizes from 5 MB to 20 MB. Singlepart data object 500.2 has a part size of 2 units and singlepart data object 500.3 has a size of 4 units. Multipart data object 500.4 includes three data parts ranging in size from 2-3 units and totalling 7 units for the object size. The data objects 500 are arranged in effectively random order based on when they were received or identified by batch collector 232.

From batch list 232.1, replication work generator 234 may identify each data part that will need to be replicated to complete the batch. So, for example, multipart data object 500.1 corresponds to six data parts: data part 500.1.1 with a part size of 2 units, data part 500.1.2 with a part size of 3 units, data part 500.1.3 with a part size of 4 units, data part 500.1.4 with a part size of 1 unit, data part 500.1.5 with a part size of 2 units, and data part 500.1.6 with a part size of 1 unit. Singlepart data objects 500.2 and 500.3 correspond directly to single data parts of the same size, data part 500.2.1 with a size of 2 units and data part 500.3.1 with a size of 4 units. Multipart data object 500.4 corresponds to three data parts: data part 500.4.1 with a part size of 3 units, data part 500.4.2 with a part size of 2 units, and data part 500.4.3 with a part size of 2 units. The order of data parts within the multipart data objects 500.1 and 500.4 may be effectively random or based on the algorithm used to divide the data objects into their corresponding parts.

Figure 6:
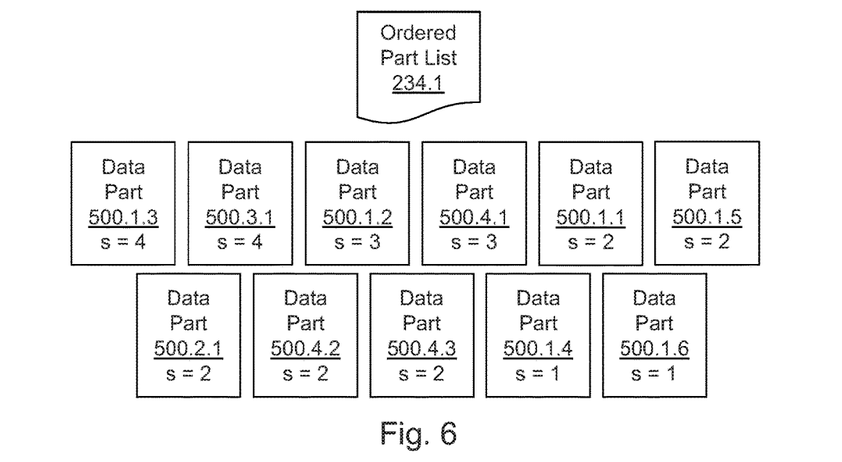
FIG. 6 schematically illustrates an example ordered part list based on the example batch list of FIG. 5.

In FIG. 6, replication work generator 234 has reordered ordered part list 234.1 to include all data object parts sorted from largest to smallest by size, irrespective of which data objects 500 they came from. The data parts are presented in two lines for convenience but should be understood as a single ordered list proceeding from left to right in the top row and then left to right in the bottom row. After sorting, ordered part list 234.1 is data part 500.1.3 (4 units), 500.3.1 (4 units), 500.1.2 (3 units), 500.4.1 (3 units), 500.1.1 (2 units), 500.1.5 (2 units), 500.2.1 (2 units), 500.4.2 (2 units), 500.4.3 (2 units), 500.1.4 (1 unit), and 500.1.6 (1 unit). The data parts from different objects are intermingled such that singlepart data object 500.3 (data part 500.3.1) is between two parts of multipart data object 500.1 (data part 500.1.3 and data part 500.1.2) and singlepart data object 500.2 is between parts of multipart data objects 500.1 (data part 500.1.5) and 500.4 (data part 500.4.2). Similarly, data parts from multipart data objects 500.1 and 500.4 are intermingled and not in their original orders.

Figure 7:
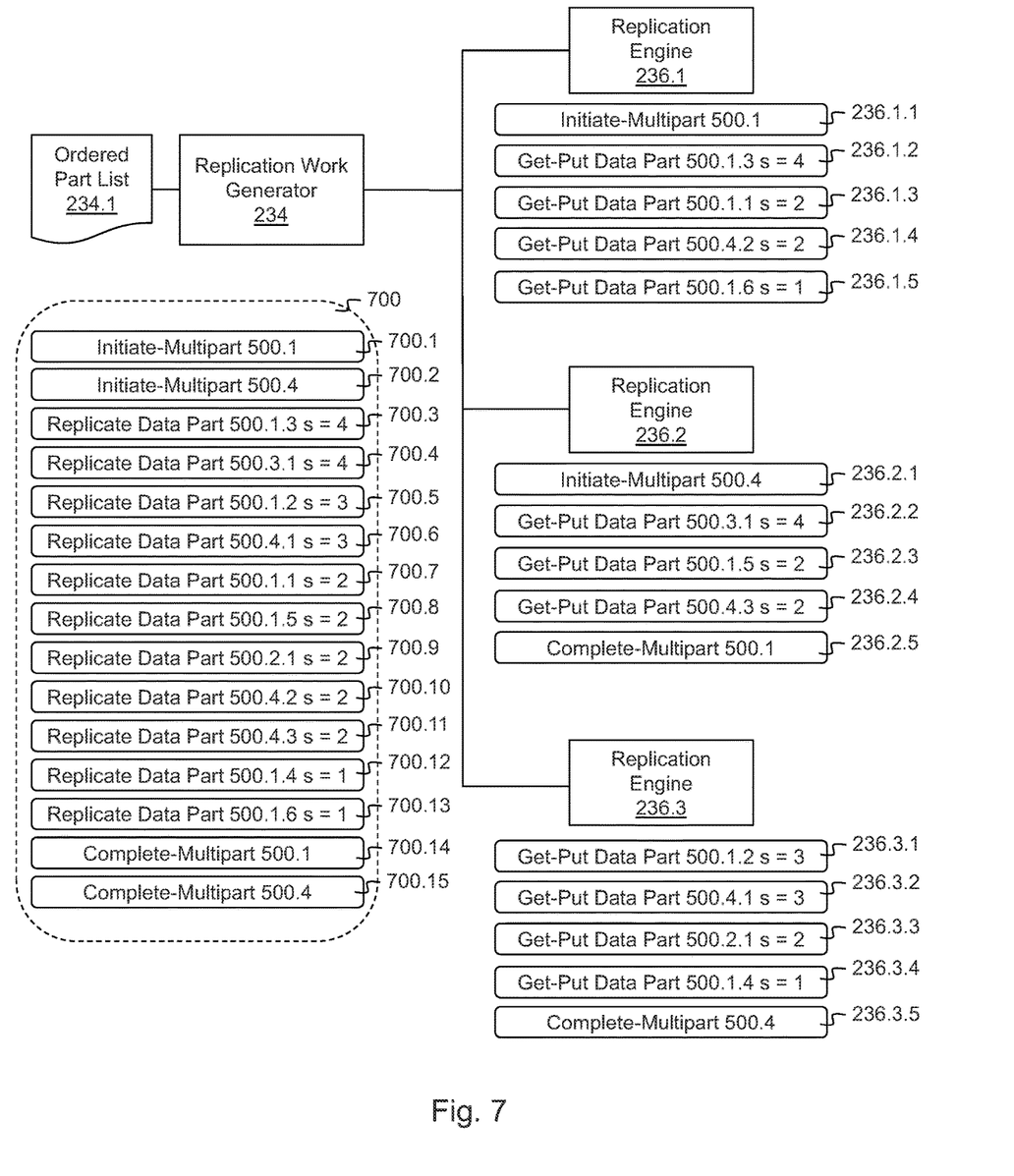
FIG. 7 schematically illustrates an example command structure based on the example ordered part list of FIG. 6.

In FIG. 7, replication work generator 234 generates a replication command queue 700 from ordered part list 234.1.

As described above, replication work generator 234 begins the replication command queue 700 with initiate-multipart commands for each of multipart data objects 500.1 and 500.4, initiate-multipart 500.1 command 700.1 and initiate-multipart 500.4 command 700.2, before replicate data part commands 700.3-700.13. Replicate data part commands 700.3-700.13 proceed according to the sorted part order in ordered part list 234.1. Complete-multipart commands 700.14 and 700.15 follow assignment of all replicate data part commands 700.3-700.13.

In this example, three replication engines 236.1, 236.2, and 236.3 are available for use in replicating the data parts from batch list 232.1 as represented by replication command queue 700. Replication engines 236.1, 236.2, 236.3 are assumed to be idle and to have similar rates for completion of replication work. They may be registered in replication engine registry 234.3 as available in the order they appear. Therefore, replication work generator 234 allocates initiate-multipart 500.1 command 700.1 to replication engine 236.1 to execute an initiate-multipart 500.1 operation 236.1.1 to a target storage node 30 and initiate-multipart 500.4 command 700.2 to replication engine 236.2 to execute initiate-multipart 500.4 operation 236.2.1 to the same or a different target storage node 30. Because the initiate-multipart operations take a minimal amount of time to process, replication engines 236.1 and 236.2 are available in replication engine registry 234.3 when replication work generator 234 begins assigning replicate data part commands 700.3-700.13 and replicate data part 500.1.3 command 700.3 is sent to replication engine 236.1 and replicate data part 500.3.1 command 700.4 is sent to replication engine 236.2. In response, replication engines 236.1 and 236.2 execute the necessary operations to GET-PUT data part 500.1.3 replication task 236.1.2 and GET-PUT data part 500.3.1 replication task 236.2.2 respectively, both with part size 4 units. Replicate data part 500.1.2 command 700.5 is assigned and sent to replication engine 236.3 and results in GET-PUT data part 500.1.2 replication task 236.3.1, with a part size of 3 units, being executed. Because replication tasks 236.1.2, 236.2.2, and 236.3.1 are being processed in parallel and replication task 236.3.1 relates to the transfer of a smaller part size (3 units compared to 4 units), replication engine 236.3 completes its operations first and registers with replication engine registry 234.3 as available and receives the next data part for processing. Replication work generator 234 assigns and sends replicate data part 500.4.1 command 700.6 to replication engine 236.3 and results in GET-PUT data part 500.4.1 replication task 236.3.2, with a part size of 3 units, being executed. While replication engine 236.3 is busy with data part 500.4.1, replication engines 236.1 and 236.2 complete their first data parts and are available for data parts 500.1.1 and 500.1.5 respectively. Replication work generator 234 assigns and sends replicate data part 500.1.1 command 700.7 to replication engine 236.1 and results in GET-PUT data part 500.1.1 replication task 236.1.3, with a part size of 2 units, being executed. Replication work generator 234 assigns and sends replicate data part 500.1.5 command 700.8 to replication engine 236.2 and results in GET-PUT data part 500.1.5 replication task 236.2.3, with a part size of 2 units, being executed.

After assigning command 700.8, all three replication engines 236.1, 236.2, and 236.3 have been allocated 6 units of replication tasks and minor variations in performance may result in any one of them completing their tasks first. In the example shown, replication engine 236.3 completes its replication task first, communicates SUCCESS to replication work generator 234 and registers for the next available replication task. It is followed by replication engines 236.1 and 236.2 and the assignment of the next tasks (all 2 units in size) follows this order. Replication work generator 234 assigns and sends replicate data part 500.2.1 command 700.9 to replication engine 236.3 and results in GET-PUT data part 500.2.1 replication task 236.3.3 being executed. Replication work generator 234 assigns and sends replicate data part 500.4.2 command 700.10 to replication engine 236.1 and results in GET-PUT data part 500.4.2 replication task 236.1.4 being executed. Replication work generator 234 assigns and sends replicate data part 500.4.3 command 700.11 to replication engine 236.2 and results in GET-PUT data part 500.4.3 replication task 236.2.4 being executed. These tasks would again execute in parallel with similar expected times to completion. In the example shown, replication engine 236.3 maintains its lead and first position in replication engine registry 234.3 for the next round of command assignments and replication engines 236.1 and 236.2 again follow. Replication work generator 234 assigns and sends replicate data part 500.1.4 command 700.12 to replication engine 236.3 and results in GET-PUT data part 500.1.4 replication task 236.3.4 being executed. Replication work generator 234 assigns and sends replicate data part 500.1.6 command 700.13 to replication engine 236.1 and results in GET-PUT data part 500.1.6 replication task 236.1.5 being executed. Replicate data part 500.1.6 command 700.13 is the last replicate data command in replication command queue 700 and is followed by the two complete-multipart commands, complete-multipart 500.1 command 700.14 and complete-multipart 500.4 command 700.15. Replication engine 236.2 is available and assigned and sent complete-multipart 500.1 command 700.14 and results in complete-multipart 500.1 replication task 236.2.5. Replication engine 236.3 manages to complete GET-PUT data part 500.1.4 replication task 236.3.4, which had a part size of 1 unit, before replication engine 236.1 or 236.2 complete their current tasks and is assigned the final command in replication command queue 700. Replication work generator 234 assigns and sends complete-multipart 500.4 command 700.15 to replication engine 236.3 and results in complete multipart 500.4 replication task 236.3.5 being executed. This completes data replication of the batch of data objects included in batch list 232.1 in the order provided in ordered parts list 234.1.

Figure 8:
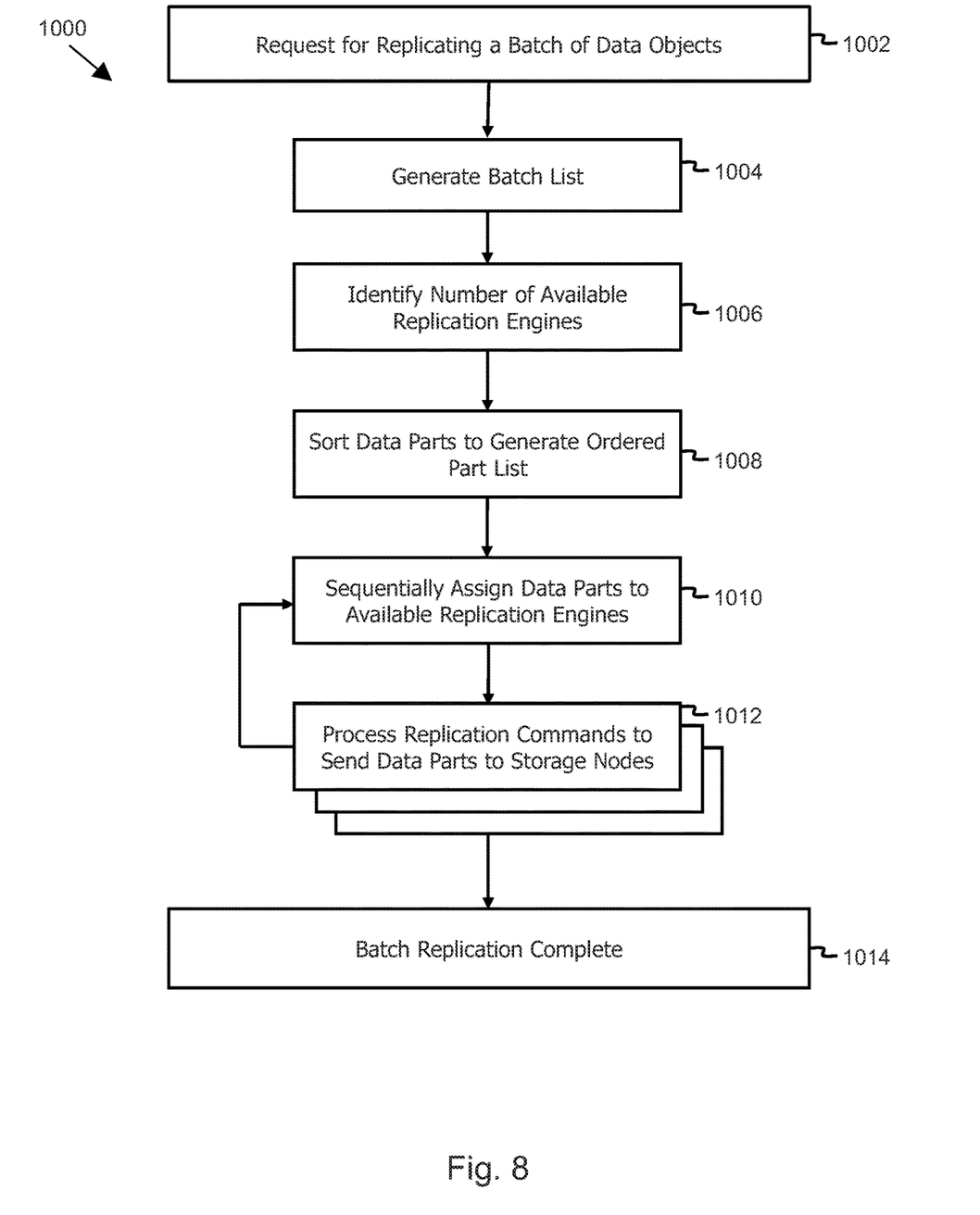
FIG. 8 illustrates an example embodiment of a method for ordered parallel replication of data object parts using a distributed object storage system.

As shown in FIG. 8, the distributed storage system 1 can be operated according to an ordered parallel replication method for batches of data objects, i.e. according to the method 1000 illustrated by the blocks 1002-1014 of FIG. 8.

After a request for replicating a batch of data objects is received in block 1002, a batch list, such as batch list 232.1, is generated to identify the data objects to be replicated. For example, batch collector 232 may generate batch list 232.1 from the request for replicating a batch of data objects received in block 1002 and metadata regarding the batch of data objects available to batch collector 232. Batch collector 232 may identify singlepart and multipart data objects in batch list 232.1.

At block 1006, a number of available replication engines are identified. For example, replication work generator 234 may determine that a plurality of replication engines 236 are available for use in processing replication tasks related to batch list 232.1. These available replication engines may register with replication work generator 234 for parallel processing of data replication tasks. At block 1008, data parts corresponding to the singlepart and multipart data objects in batch list 232.1 are sorted to generated an ordered part list, such as ordered part list 234.1. For example, replication work generator 234 may identify and list the data parts corresponding to the data objects in batch list 232.1 and then sort the list using a predetermined sorting routine, such as by part size from largest to smallest, to create ordered part list 234.1. At block 1010, data parts are sequentially assigned to the available replication engines 236. For example, replication work generator 234 may assign replication tasks corresponding to the data parts in ordered part list 234.1 in the sequential order that they have in ordered part list 234.1 to the available replication engines.

At block 1012, replication commands are processed in parallel by multiple replication engines to send data parts to storage nodes 30. For example, replication engines 236 may receive replicate data commands from replication work generator 234, process those commands to generate GET and PUT operations, and execute the GET and PUT operations to replicate the assigned data parts. As replication engines complete their assigned tasks, they may be assigned the next task based on ordered part list 234.1. After all data parts in ordered part list 234.1 have been replicated, batch replication is complete at block 1014.

Figure 9:
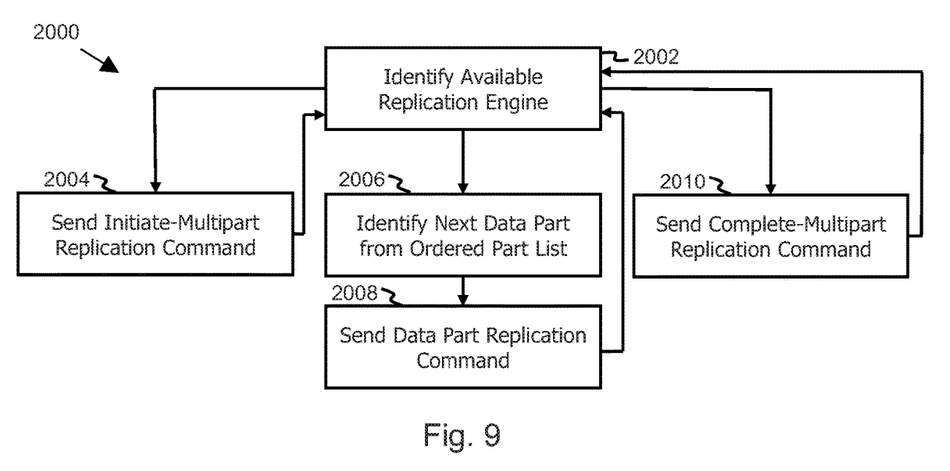
FIG. 9 further illustrates the example method of FIG. 8 with regard to a replication work generator.

As shown in FIG. 9, replication work generator 234 may manage both administrative commands and data part commands in a method 2000 of sequentially sending data replication commands to replication engines 236. In some embodiments, method 2000 is executed by a replication work generator, such as replication work generator 234, in response to having a command queue to assign among replication engines 236. At block 2002, an available replication engine 236 is identified. For example, the next available replication engine may be selected from a list of available replication engines, such as replication engine registry 234.3, for receiving a replication command from the command queue.

At block 2004, an initiate-multipart replication command for the batch of data objects being replicated is sent. Block 2004 may be completed for each multipart data object in the batch of data objects, returning to block 2002 to identify the next available replication engine for each initiate-multipart replication command. When all initiate-multipart replication commands have been completed, return to block 2002 to identify the next available replication engine and proceed to data part replication commands. When a next available replication engine is identified in block 2002 and the next replication command in the command queue is a data part replication command, proceed to block 2006.

At block 2006, the next data part from the ordered part list is identified. For example, the command queue may include and ordered list of data part replication commands based on the ordered part list and replication work generator 234 may select the next data part replication command, which identifies the next data part to be replicated. The selected data replication command for the identified next data part is then sent to the identified replication engine and the method returns to block 2002. Note that replication work generator 234 may not wait for the command to complete before returning to block 2002 for the next replication command, but rather run as many replication tasks in parallel as the available replication engines will support. Blocks 2006 and 2008 may be completed for each data part corresponding to data objects in the batch of data objects, returning to block 2002 to identify the next available replication engine until all replication commands for data parts have been sent. When all data part replication commands have been completed, return to block 2002 to identify the next available replication engine and proceed to complete-multipart replication commands in block 2010.

At block 2010, a complete-multipart replication command for the batch of data objects being replicated is sent. Block 2010 may be completed for each multipart data object in the batch of data objects, returning to block 2002 to identify the next available replication engine for each complete-multipart replication command. When all complete-multipart replication commands have been completed, assignment of replication commands is complete for the batch of data objects being replicated.

Figure 10:
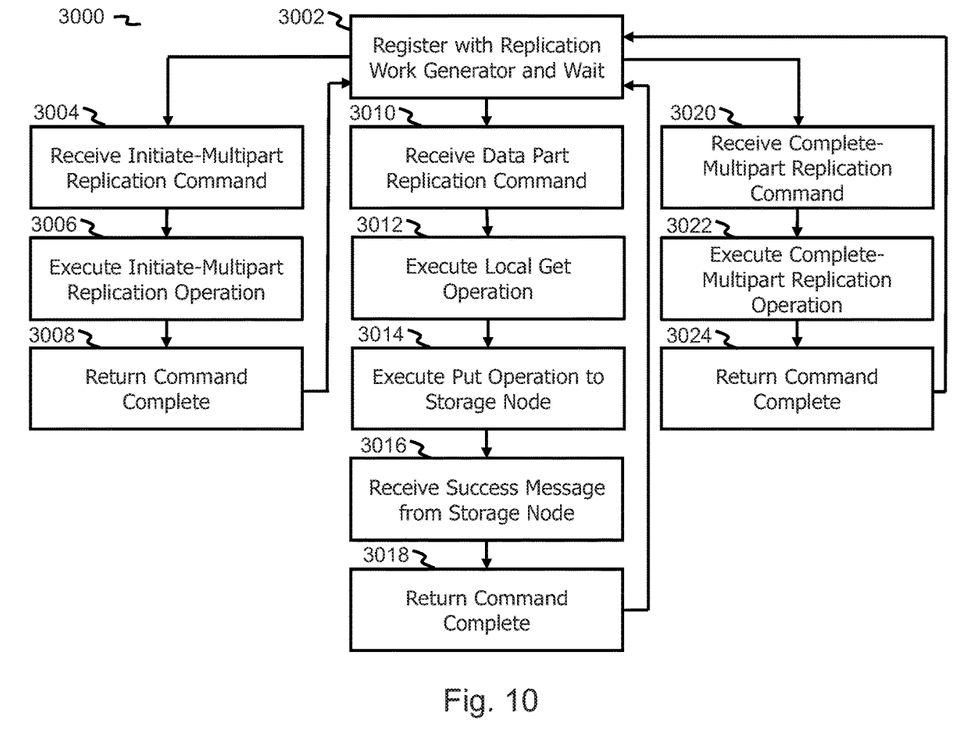
FIG. 10 further illustrates the example method of FIG. 8 with regard to replication engines.

As shown in FIG. 10, each replication engine 236 may be capable of executing both administrative and data part replication commands received from replication work generator 234 in a method 3000 of processing data replication commands to execute data replication operations. In block 3002, a replication engine 236.1 registers with replication work generator 234 and waits to receive a replication command. In some embodiments, replication work engines 236 may receive one of at least three types of replication commands: an initiate-multipart replication command at block 3004, a data part replication command at block 3010, and a complete-multipart command at block 3020. Additional command types may be possible, including other administrative commands, delete commands, etc.

At block 3004, an initiate-multipart replication command is received by replication engine 236.1. At block 3006, the initiate-multipart replication command is executed by identifying the target storage node, formatting an initiate-multipart operation according to the syntax and communication protocols for communicating with the target storage node, and executing the initiate-multipart operation with the target storage node. In some embodiments, replication engine 236.1 will then wait for a command complete or success message from the target storage node before proceeding to block 3008. At block 3008, a command complete or success message is returned to replication work generator 234 and replication engine 236.1 again registers with replication work generator 234 at block 3002 and waits for a next replication command.

At block 3010, a data part replication command is received by replication engine 236.1 and a target storage node is identified. At block 3012, a local get operation is formatted and executed to locate the data part for replication and prepare it for replication. At block 3014, a put operation for the data part located in block 3012 is executed to send the data part for replication to the target storage node. At block 3016, replication engine 236.1 waits for a success message from the target storage node indicating a successful transfer of the data part. At block 3018, a command complete or success message is returned to replication work generator 234 and replication engine 236.1 again registers with replication work generator 234 at block 3002 and waits for a next replication command.

At block 3020, a complete-multipart replication command is received by replication engine 236.1. At block 3022, the complete-multipart replication command is executed by identifying the target storage node, formatting a complete-multipart operation according to the syntax and communication protocols for communicating with the target storage node, and executing the complete-multipart operation with the target storage node. In some embodiments, replication engine 236.1 will then wait for a command complete or success message from the target storage node before proceeding to block 3024. At block 3024, a command complete or success message is returned to replication work generator 234 and replication engine 236.1 again registers with replication work generator 234 at block 3002 and waits for a next replication command. Note that, depending on the number of replication engines and command queue for any given batch of data objects, replication engine 236.1 may complete one, several, or many replication commands for a given batch of objects. In some cases, the next replication command received after re-registering may come from a different batch of data objects and replication engines 236 may be configured to execute the replication commands received without regard to the batch list the replication command relates to.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, RAM, ROM, an EPROM, an EEPROM, a Flash memory, an optical fiber, a CD-ROM, an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A system, comprising:
   at least one processor;
   at least one memory coupled to the at least one processor;
   a plurality of storage nodes configured to receive data objects;
   a plurality of replication engines in the at least one memory for execution by the at least one processor, each of the plurality of replication engines configured to communicate with at least one of the plurality of storage nodes;
   a batch collector stored in the at least one memory for execution by the at least one processor, the batch collector configured to generate a batch list of a plurality of data objects in response to a replication request, wherein the batch list of the plurality of data objects identifies a plurality of data parts, each of the data parts having a part size; and
   a replication work generator stored in the at least one memory and executable by the at least one processor to perform operations comprising:
      identifying a number of available replication engines from the plurality of replication engines;
      receiving the batch list from the batch collector;
      sorting the plurality of data parts according to a predetermined sorting routine, wherein the predetermined sorting routine sorts the plurality of data parts according to part size from largest part size to smallest part size, thereby creating an ordered list of data parts; and
      sequentially assigning the plurality of data parts from the ordered list across the number of available replication engines for parallel processing of replication commands by the available replication engines.

2. The system of claim 1, wherein each of the plurality of replication engines corresponding to the number of available replication engines is further configured to:
   receive a replication command from the replication work generator;
   complete the replication command; and
   communicate a command complete message to the replication work generator.

3. The system of claim 2, wherein the operations of the replication work generator further comprise:
   assigning a next data part from the ordered list to a replication engine upon receiving the command complete message; and
   sending a next replication command to the replication engine for the next data part.

4. The system of claim 1, wherein:
   the batch list of the plurality of data objects includes a plurality of multipart data objects; and
   the operations of the replication work generator further comprise assigning initiate-multipart replication commands for each of the plurality of multipart data objects to the available replication engines prior to assigning the plurality of data parts from the ordered list to the available replication engines.

5. The system of claim 1, wherein:
   the batch list of the plurality of data objects includes at least one multipart data object and at least one singlepart data object; and the ordered list of data parts includes the at least one singlepart data object in between data parts corresponding to the at least one multipart data object.

6. The system of claim 1, wherein processing of the replication commands by the available replication engines includes:
 executing a local get operation; and
 executing a put operation to the at least one of the plurality of storage nodes.

7. The system of claim 1, wherein the batch list of the plurality of data objects includes, for each data object of the plurality of data objects:
 an object resource locator;
 an object size;
 an object type; and
 an operation type.

8. The system of claim 7, wherein:
 the object type includes a multipart object type; and
 the batch list further includes part sizes for the multipart object type.

9. The system of claim 1, wherein:
 the batch list of the plurality of data objects includes a first multipart data object and a second multipart data object; and
 the ordered list of data parts includes at least one data part corresponding to the first multipart data object in between data parts corresponding to the second multipart data object.

10. A computer-implemented method, comprising:
 generating a batch list of a plurality of data objects in response to a replication request, wherein the batch list of the plurality of data objects identifies a plurality of data parts, each of the data parts having a part size;
 identifying a number of available replication engines from a plurality of replication engines, each of the plurality of replication engines configured to communicate with at least one of a plurality of storage nodes, the plurality of storage nodes configured to receive data objects;
 sorting the plurality of data parts in the batch list according to a predetermined sorting routine, wherein the predetermined sorting routine sorts the plurality of data parts according to part size from largest part size to smallest part size, thereby creating an ordered list of data parts;
 sequentially assigning the plurality of data parts from the ordered list across the number of available replication engines for parallel processing of replication commands by the available replication engines; and
 processing the replication commands corresponding to the plurality of data parts from the ordered list using the number of available replication engines where a next available replication engine sends a next data part from the ordered list to the at least one of the plurality of storage nodes.

11. The computer-implemented method of claim 10, wherein sequentially assigning the plurality of data parts is executed by a replication work generator and further comprises:
 sending replication commands from the replication work generator to the available replication engines; and
 receiving command complete messages from the available replication engines to the replication work generator to indicate the next available replication engine is ready to send the next data part from the ordered list.

12. The computer-implemented method of claim 10, wherein generating the batch list of the plurality of data objects is executed by a batch collector.

13. The computer-implemented method of claim 10, wherein the batch list of the plurality of data objects includes a plurality of multipart data objects, and further comprising:
 assigning initiate-multipart replication commands for each of the plurality of multipart data objects to the available replication engines prior to assigning the plurality of data parts from the ordered list to the available replication engines.

14. The computer-implemented method of claim 10, wherein:
 the batch list of the plurality of data objects includes at least one multipart data object and at least one singlepart data object; and
 the ordered list of data parts includes the at least one singlepart data object in between data parts corresponding to the at least one multipart data object.

15. The computer-implemented method of claim 10, wherein processing the replication commands includes:
 executing a local get operation; and
 executing a put operation to the at least one of the plurality of storage nodes.

16. The computer-implemented method of claim 10, wherein the batch list of the plurality of data objects includes, for each data object of the plurality of data objects:
 an object resource locator;
 an object size;
 an object type; and
 an operation type.

17. The computer-implemented method of claim 16, wherein:
 the object type includes a multipart object type; and
 the batch list further includes part sizes for the multipart object type.

18. The computer-implemented method of claim 10, wherein:
 the batch list of the plurality of data objects includes a first multipart data object and a second multipart data object; and
 the ordered list of data parts includes at least one data part corresponding to the first multipart data object in between data parts corresponding to the second multipart data object.

19. A system, comprising:
 means for generating a batch list of a plurality of data objects in response to a replication request, wherein the batch list of the plurality of data objects identifies a plurality of data parts, each of the data parts having a part size;
 means for identifying a number of available replication engines from a plurality of replication engines, each of the plurality of replication engines configured to communicate with at least one of a plurality of storage nodes, the plurality of storage nodes configured to receive data objects;
 means for sorting the plurality of data parts in the batch list according to a predetermined sorting routine, wherein the predetermined sorting routine sorts the plurality of data parts according to part size from largest part size to smallest part size, thereby creating an ordered list of data parts;
 means for sequentially assigning the plurality of data parts from the ordered list across the number of available replication engines for parallel processing of replication commands by the available replication engines; and
 means for processing the replication commands corresponding to the plurality of data parts from the ordered list using the number of available replication engines where a next available replication engine sends a next data part from the ordered list to the at least one of the plurality of storage nodes.

20. The system of claim 19, wherein:

the batch list of the plurality of data objects includes at least one multipart data object and at least one singlepart data object; and the ordered list of data parts includes the at least one singlepart data object in between data parts corresponding to the at least one multipart data object.

\* \* \* \* \*